J. H. & E. W. BULLARD.
SPEEDOMETER.
APPLICATION FILED DEC. 21, 1906.
935,583.
Patented Sept. 28, 1909.
2 SHEETS—SHEET 1.
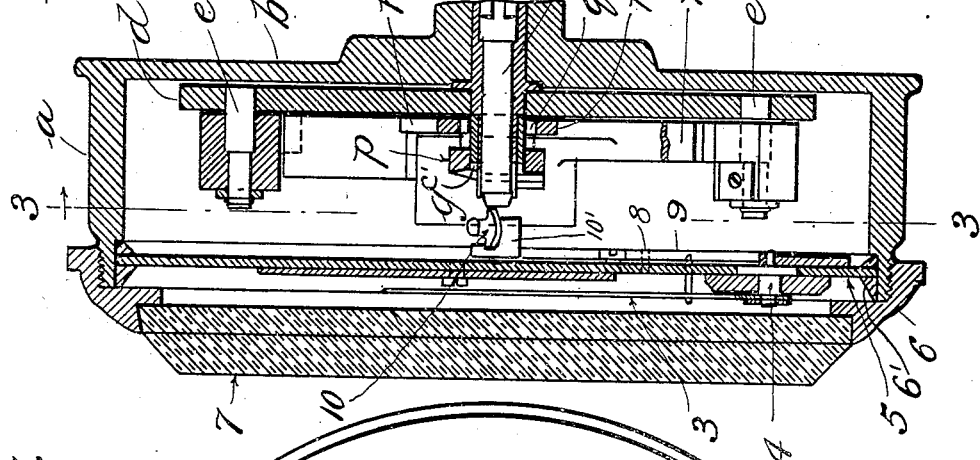
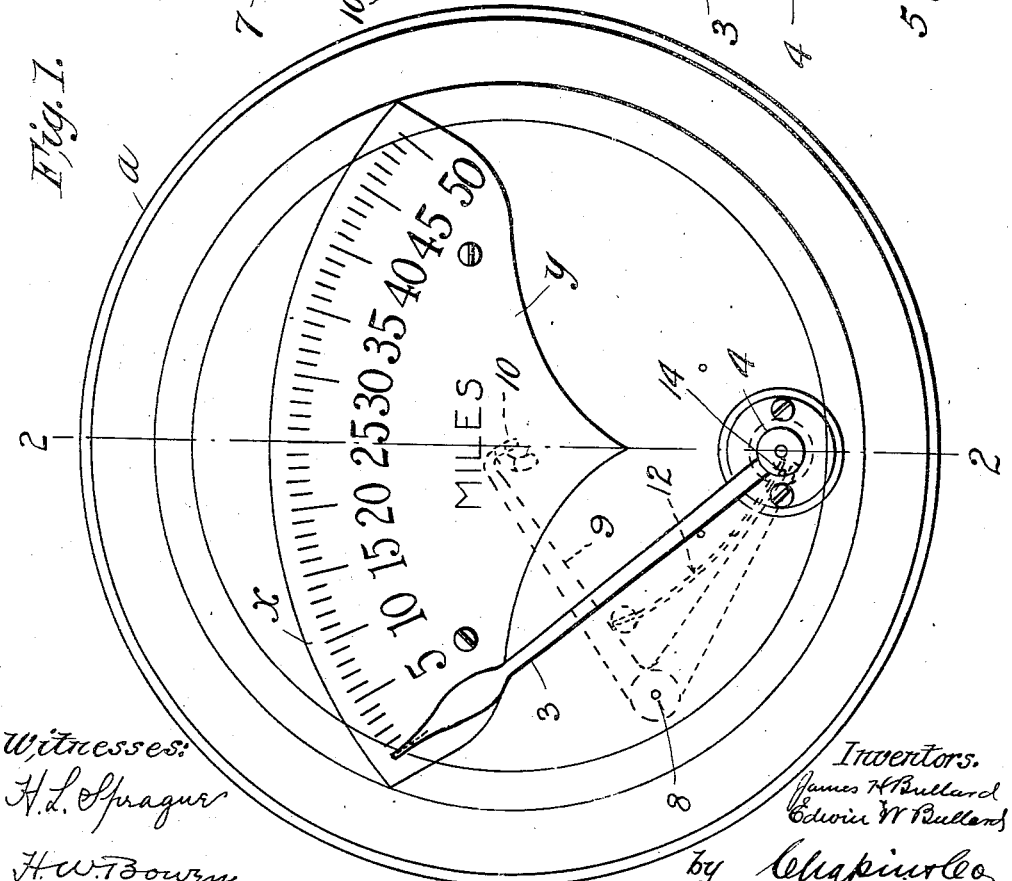
Witnesses:
H. L. Sprague
H. W. Bowen
Inventors.
James H Bullard
Edwin W Bullard
by Chapin & Co
Attorneys.

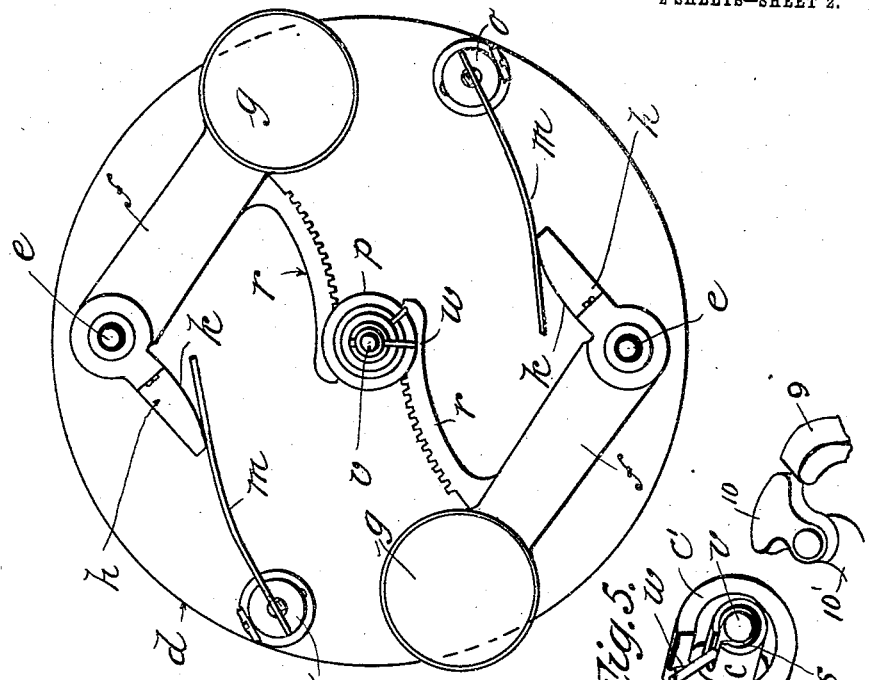
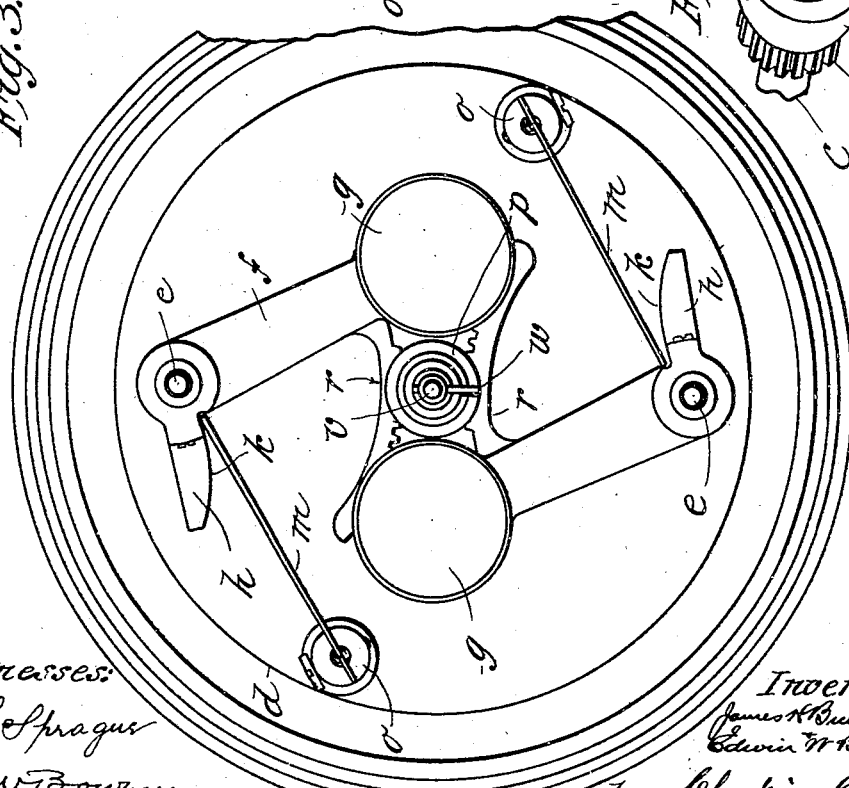

UNITED STATES PATENT OFFICE.

JAMES H. BULLARD AND EDWIN W. BULLARD, OF SPRINGFIELD, MASSACHUSETTS, ASSIGNORS TO BULLARD SPECIALTY CO., OF SPRINGFIELD, MASSACHUSETTS, A CORPORATION OF MASSACHUSETTS.

SPEEDOMETER.

935,583. Specification of Letters Patent. Patented Sept. 28, 1909.

Application filed December 21, 1906. Serial No. 348,904.

*To all whom it may concern:*

Be it known that we, JAMES H. BULLARD and EDWIN W. BULLARD, both citizens of the United States of America, residing at Springfield, in the county of Hampden and State of Massachusetts, have invented new and useful Improvements in Speedometers, of which the following is a specification.

This invention relates to speed indicating devices for vehicles and especially to that class of these devices which are actuated on the principle of centrifugal governors, the object of the invention being to provide a mechanism of this type in which the rotary movements of the actuating elements of the mechanism are provided with compensating means whereby the movements transmitted thereby to the indicating pointer may be uniform at all speeds, means being provided to render the movements of the pointer steady during its swinging movement in either direction, regardless of the vibration of its support.

Incidental to the above characteristics is the fact that the construction makes it possible to provide an indicating scale having uniform divisions owing to the uniformity of movement of the indicating pointer at all speeds.

Having these ends in view, the invention consists in mechanisms hereinafter described and set forth clearly in the claims and illustrated in the accompanying drawings, in which,—

Figure 1 is a face view of the instrument showing the indicating scale and pointer, and in dotted lines the elbow lever for actuating the pointer. Fig. 2 is a sectional elevation taken on line 2—2, Fig. 1. This view shows clearly the connection between the axis of the instrument and one arm of the elbow-lever which actuates the pointer. Fig. 3 is a plan view of the instrument looking in the direction of the arrow on line 3—3 of Fig. 2, and showing the internal arrangement of the centrifugally actuating element and associated parts, the casing portion of the instrument being shown in full lines. Fig. 4 is a view of the rotating disk carrying the centrifugally actuated arms and in a position at substantially the extremity of their outward movement; also showing the compensating devices for these arms. Fig. 5 is a perspective view in detail of a part of the center shaft and axially movable pin, and the connection between this pin and one end of the elbow-lever which imparts movement to the indicating pointer, the parts being shown in separated relation for the purpose of clearness.

Referring now to these drawings, and specifically to Figs. 1 and 2, $a$ indicates a circular metal casing, the back side $b$ of which is closed and provided with a hub-like extension which constitutes a bearing for a tubular shaft $c$ to the outer end of which a flexible or other suitable driving-shaft is attached. The shaft $e$ extends within the casing and has fixed thereto a circular plate $d$ on which are secured studs $e$ at right angles thereto and equi-distant from the center. On these studs are revolubly mounted the arms $f$ provided at their extremities with the weights $g$, and extending from that end of each arm through which the stud $e$ passes, and substantially at right angles to said arm is a short projection $h$ having a curved side or surface $k$ against which the free end of a spring $m$ bears. The springs $m$ are supported on the plate $d$ in split bosses $o$, or in some other suitable way. When the arms $f$ are at rest, the springs will hold them in the position shown in Fig. 3, that is with their weights $g$ in contact with the periphery of the cam $p$ which is provided on its hub with a pinion $q$ fixed to it so that the cam and pinion are revolved together on the end of the tubular shaft $c$ which extends within the casing, as shown in Fig. 2 very clearly, the cam and pinion being shown also in perspective in Fig. 5. On each of the arms $f$ is a segmental rack $r$. These racks extend one toward the other and engage opposite sides of the pinion $q$.

The operative surface of the cam $p$ is shown clearly in Figs. 2 and 5, said surface being cut in the form of a helix surrounding the inner end of the tubular shaft $c$ which latter is split lengthwise thereof for a certain distance, as shown at $s$ Fig. 5; located axially of this shaft is an endwise movable pin $v$ which has fixed in the side thereof a short pin $w$, which, when the instrument is at rest, rests on the lowest part of the helical surface $c^1$ of the cam $p$, as shown in Fig. 5 and also in Fig. 3.

From the foregoing description, it is seen that the rotation of the tubular shaft $c$ will rotate the plate d carrying the arms f and that the cam p and its attached pinion q, and endwise movable pin v also rotate in unison with the shaft. The rotation of these elements, obviously, will, by centrifugal force, cause the weighted ends of the levers f to swing apart, and this action, by the engagement of the racks r with the pinion q, will effect the rotation of the cam p and thus force the pin v endwise out of the tubular shaft c, and any decrease in the speed of rotation will effect the return movement of the weighted ends g of the arms f toward the center shaft by reason of the action of the springs m bearing upon the projections h of these arms. It will be observed that the surface of these projections on which the springs bear is curved, as indicated by k, the degree of curvature being such that as the arms f swing away from the center, the point of contact between these projections and the springs will move toward the fixed end of the spring, and these parts are so proportioned that the corresponding increase in tension of the springs, (due to the shortening of the springs and the increase in the leverage between the spring and the axis e of the arm,) will offset the increased momentum of the weighted ends of these arms due to an increasing speed of rotation, and so counterbalance this increasing momentum by the automatic shifting of the point of contact of the springs and the arms h, so that whether the rotation of the plate d be at high speed or at a low speed, the degree of separation of the arms f and the consequent amount of rotation of the cam p will be directly proportional to the speed, thus permitting the divisions x of the indicating scale y shown in Fig. 1, to be made uniform. This is quite an important feature as without the compensating devices for the arms f or devices having a similar function, the division lines x, which show the miles per hour would have to be varied; whereas, by means of the present construction, the movement of the indicating pointer 3 will be the same for the last mile on the scale as for the first.

The indicating pointer 3 is fixed to a revoluble stud 4, as shown in Fig. 2, and is mounted on a metal plate 5 which constitutes practically a partition between the front and rear parts of the casing a, this plate being held in position by the screwing down of a ring 6 on the casing which engages the ring 6¹. The ring 6 also constitutes a holding frame for a glass front 7 of the instrument. On the same plate 5 at 8, (Figs. 1 and 2) is pivotally supported an elbow-lever 9 which is clearly shown in dotted lines in said Fig. 1. One arm of this lever extends to the stud 4 on which the pointer is fixed, and the other arm of the lever extends toward the vertically movable pin v at the axis of the instrument, its end lying in proximity to said pin. On the plate 5 is pivotally supported by means of a bracket arm 10¹ the small elbow-lever 10 whose axis is at right angles to the pin v and one end of this lever bears on the end of the pin v, and the other end against the end of the arm of the elbow-lever 9 which extends toward the center of the instrument. A spring 12 (shown clearly in Fig. 2) bears on the other arm of the lever 9, whereby the arm of the latter which lies over the pin v and the short elbow-lever 10 are constantly held in contacting relation, and said elbow-lever 10 also is constantly held in contact with the end of the pin v. By means of this construction no lost motion can occur between the vertical movement of the pin v and the horizontal movement of the elbow-lever 9. On the revoluble stud 4 is a pin 14, parallel with the axis of said stud, and against which the spring 12 bears, as shown in said Fig. 1, and whereby the pin is held in contact with that end of the elbow-lever 9 which terminates near said stud.

From the foregoing description, it is clear that into whatever position the pointer 3 may be moved by the centrifugal separation of the weighted arms f, it can not be vibrated and made to swing indefinitely in the vicinity of one or more of the indicating lines x of the scale, whether it be moving in one direction or the opposite. This is a very serious defect with some of the indicating devices as at present constructed, but with this instrument it is entirely overcome owing to the fact that all of the parts which would effect this trembling movement of the pointer are held constantly in contact with each other, and at whatever speed the arms f may be rotating at that particular instant.

From the foregoing description the vertical movements of the pin v are converted into a horizontal movement by means of the lever 10 operating on the end of the arm of the lever 9 which lies over the pin v at the center of the instrument, whereby the pointer 3 is moved by means of the other arm of the lever 9 and pin 14 over the divisions of the scale.

What we claim is:—

1. A speedometer comprising a rotatable shaft, centrifugally actuated arms, the free ends of which swing away from the shaft during the rotation of the latter, said arms each having a projection extending at an angle therefrom and provided with a curved edge; springs fixed at one end and carried by the shaft, and bearing against the curved edges of said projections, the effective length of the springs being changed by the swinging movement of the projections on which they have a bearing, and an indicating pointer actuated by the swinging movement of the arms, an elbow lever having one arm operatively engaging the pointer, its other arm being actuated by a second elbow lever, the latter being pivoted so as to move in a plane at right angles to the plane of the first mentioned elbow lever, as described.

2. A speedometer comprising a hollow, rotatable shaft, a member carried thereby, centrifugally actuated arms supported on said member and carried by the shaft, a pinion loose on the shaft, and racks on the arms engaging the pinion, an endwise movable pin located axially in said shaft, and a cam on the pinion, said pin bearing on the cam, whereby the rotation of the pinion by the centrifugal movement of the arms will impart endwise movement to the pin, an indicating pointer supported to swing at right angles to the axis of the shaft, an elbow-lever having one end engaging the pointer and its opposite end near the shaft, and a second elbow-lever bearing on the pin and the adjacent arm of the elbow-lever, and a spring bearing on the latter to hold it and the second elbow-lever constantly in contact with the pin.

3. A speedometer of the class described having in combination a rotatable shaft, a center-pin movably mounted therein, centrifugally actuated means for effecting the movement of the center-pin, a pointer pivotally mounted in a plane at right angles to the axis of the shaft, an abutment mounted on the pointer, a lever having an arm engaging one side of the abutment; a spring engaging the opposite side of the same, whereby the pointer is normally gripped and rotated toward zero position, and means engaging a second arm of the elbow-lever and the center-pin whereby the axial movement of the center pin is transformed into a movement in a plane at right angles to the shaft.

4. In combination with the pointer of a speedometer, an operating lever for the same, a pin carried by the pointer and in contact with the lever, a spring engaging the pin, the latter being located between the spring and lever, whereby vibration of the pointer is prevented, and centrifugally actuated means to swing the lever, the centrifugally actuated means including a weighted arm having a projection integral therewith, the projection having a curved edge, and a spring engaging the curved edge.

5. A speedometer having in combination, a pivotally mounted pointer, an abutment carried by the hub portion thereof, an operating lever one arm of which engages and extends past one side of the abutment, an elastic element engaging and extending past the opposite side of the abutment, and centrifugally actuated means for directly actuating the lever, whereby the pointer is operated as described, said centrifugally actuated means being provided with a projection having a curved edge, and a spring engaging said edge.

6. A speedometer having in combination, a pointer, an abutment thereon, an elbow-lever, one arm of which engages one side of the abutment, a leaf spring engaging the opposite side of the abutment, and serving to maintain the pointer in zero position, whereby the pointer is gripped and maintained against vibration, a rotatable shaft, an endwise movable element mounted therein, centrifugally actuated means for moving the element in an outward direction, and means interposed between the element and the other arm of the lever, whereby the pointer is rotated, the centrifugally actuated means including an arm having a weighted end and a projection integral with the arm, the projection having a curved edge and a spring engaging the curved edge.

7. A speedometer having in combination, a rotatable shaft, a pin mounted therein, centrifugally actuated means for moving the pin in an outward direction, a pointer adapted for movement in a plane transverse to the axis of the shaft, an abutment carried by the pointer, an elbow lever having one arm engaging the abutment, an elastic element engaging the other side of the abutment, a second elbow lever located between the other end of the first mentioned elbow-lever and the pin, whereby the pointer is actuated by the centrifugally actuating means when the pin is moved in an outward direction, as described.

JAMES H. BULLARD.
EDWIN W. BULLARD.

Witnesses:
WM. H. CHAPIN,
K. I. CLEMONS.